United States Patent [19]
Whittington et al.

[11] Patent Number: 5,272,842
[45] Date of Patent: Dec. 28, 1993

[54] REGULATED SURFACE TREATING WHEEL

[75] Inventors: Glenn A. Whittington, Lino Lakes; Steven J. Austin, Mpls., both of Minn.

[73] Assignee: Robotics and Automation Corp., Fridley, Minn.

[21] Appl. No.: 986,254

[22] Filed: Dec. 7, 1992

[51] Int. Cl.⁵ .......................... B24B 49/08; B24B 49/16
[52] U.S. Cl. .................................. 51/165.9; 51/165.87
[58] Field of Search ............. 51/165.9, 165.87, 165.77, 51/165.92, 50 H

[56] References Cited

U.S. PATENT DOCUMENTS

| 3,748,789 | 7/1973 | Wada | 51/165.9 |
| 4,118,900 | 10/1978 | Moritomo et al. | 51/165.87 |

FOREIGN PATENT DOCUMENTS

| 0142308 | 6/1980 | Fed. Rep. of Germany | 51/165.87 |
| 1645116 | 4/1991 | U.S.S.R. | 51/165.87 |

*Primary Examiner*—Robert A. Rose
*Attorney, Agent, or Firm*—Leo Gregory

[57] ABSTRACT

Relates to the regulated control of a surface treating work wheel such as for deburring, finishing or polishing a surface wherein a predetermined rate of speed and pressure of said wheel upon a surface is maintained for uniform results.

18 Claims, 3 Drawing Sheets

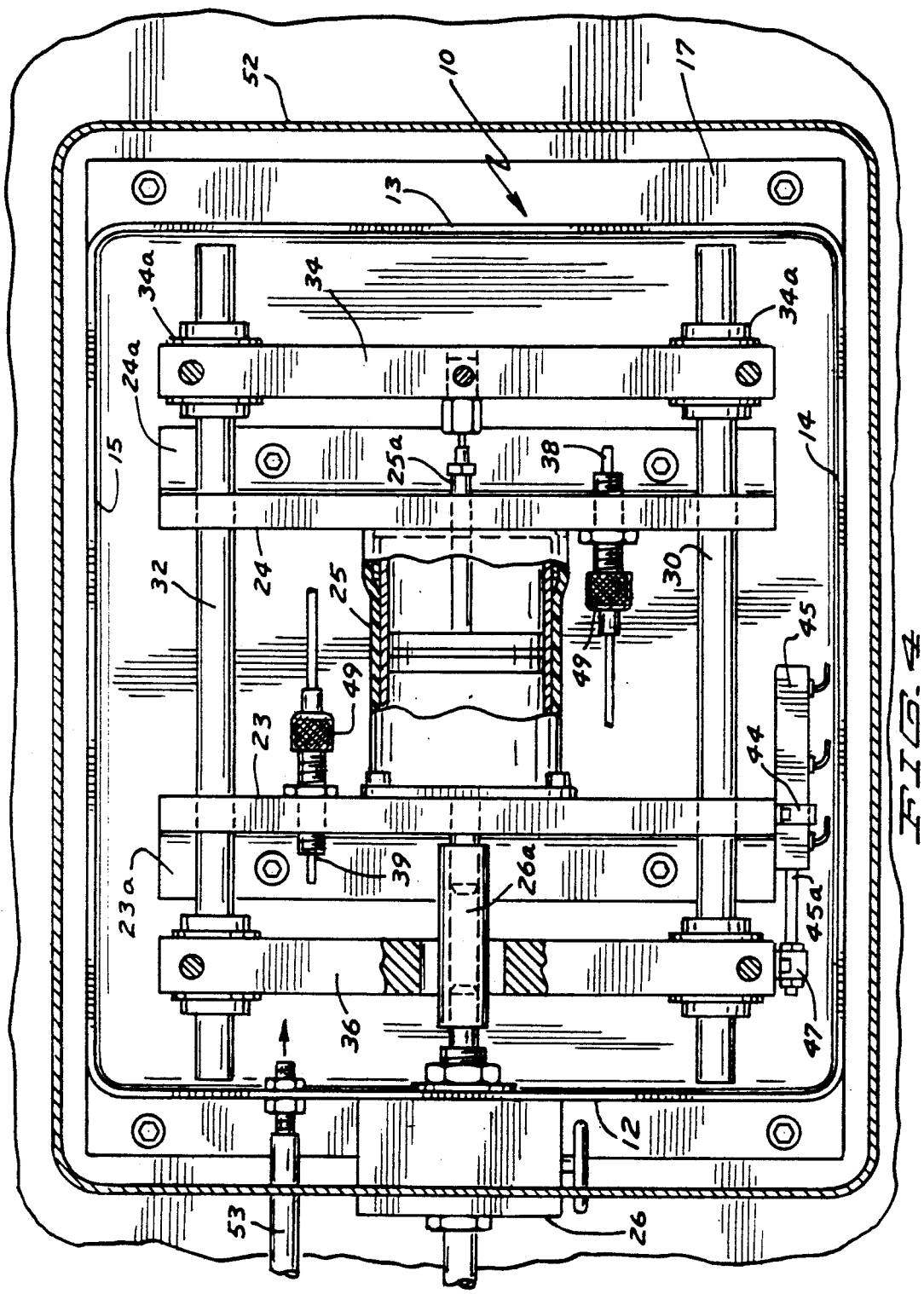

REGULATED SURFACE TREATING WHEEL

BACKGROUND OF THE INVENTION

1. Field of Invention

Relates to the regulated control of the force and speed applied by a surface treatment work wheel of a finishing and polishing machine to a work piece.

2. Description of the Prior Art

The finishing of metal or wood surfaces, traditionally, has been by hand or manual labor. The finished surfacing resulted from the skill of the workman and the uniformity of results was difficult to achieve.

There were adverse aspects to this work effort resulting from the repetitive nature of the work and the immediate environment would become dust laden creating unsatisfactory work conditions. One of the more serious aspects of this work effort was the carpal tunnel syndrome with which the workman would become afflicted.

It is desirable to provide a uniform work result and a much improved work environment.

SUMMARY OF THE INVENTION

It is a principle object herein to make automatic and self regulating the work effort of deburring, finishing and/or polishing molded, cast, forged or machined surfaces and also wood surfaces.

It is a further object herein to have a controlled self regulated degree of pressure applied by the work wheel to the surface being worked upon.

It is still a further object herein to have the work effort indicated performed automatically or by the use of a robotic machine or by a combination of the two.

It is also an object herein to automatically compensate for a change in applied pressure and speed of the work wheel as it wears.

These and other objects and advantages of the invention will be set forth in the following description made in connection with the accompanying drawings in which like reference characters refer to similar parts throughout the several views.

BRIEF DESCRIPTION OF THE DRAWINGS

FIG. 4 is a view in horizontal section as taken on line 4—4 of FIG. 3 and of FIG. 4 as indicated.

DESCRIPTION OF A PREFERRED EMBODIMENT

Figure 1:
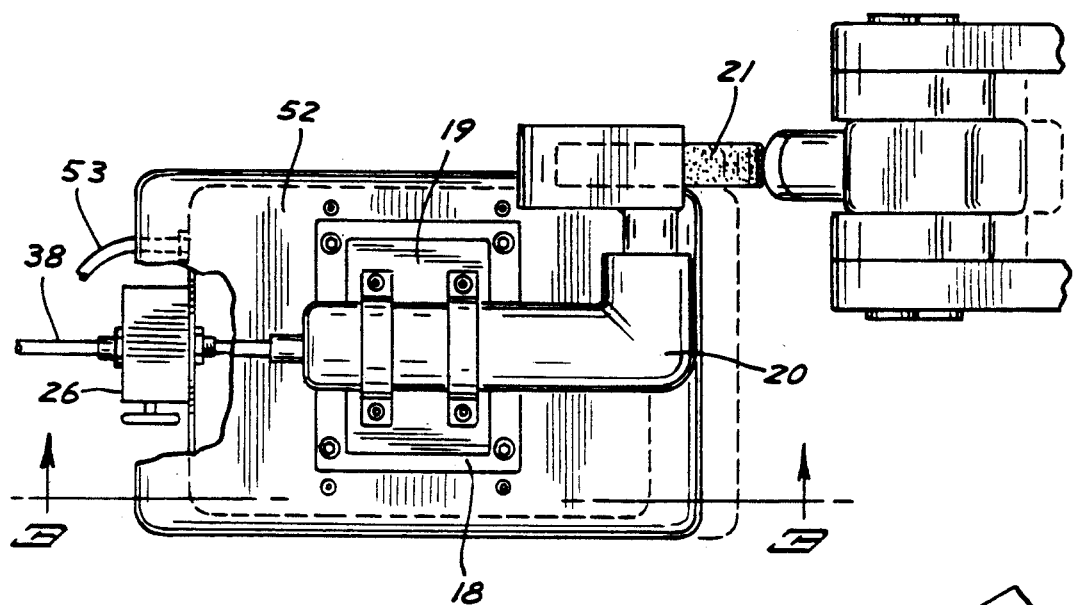
FIG. 1 is a top plan of the device herein.

As a foreward, the device of the invention herein is a bench mounted force and speed controlled device bearing a deburring, finishing or polishing work wheel to which a work piece is brought by a robotic or other automated work piece handling device. Here the work piece is brought to a contact point with the work wheel.

The device herein comprises a housing 10 resting upon a base plate 17 and having supported thereon a tool mounting plate 18 having secured thereto and upstanding therefrom a tool holding element 19 particularly adapted to have a powered tool 20 clamped thereto which tool has extending therefrom a work wheel 21 as illustrated which will have an edge surface 21a adapted for the particular work to be done such as deburring, finishing or polishing a given surface of a work piece 55 indicated here as being held in position as by a robotic arm 56. The tool may be connected to a power source or it may be self powered and will be positioned to have ample clearance for its work wheel from the mounting plate and will be oriented to have the edge surface 21a of its work wheel as its work piece engaging surface. The axis 21b of the work wheel will be at right angles to the direction of movement of the tool mounting plate as will be further described.

Figure 2:
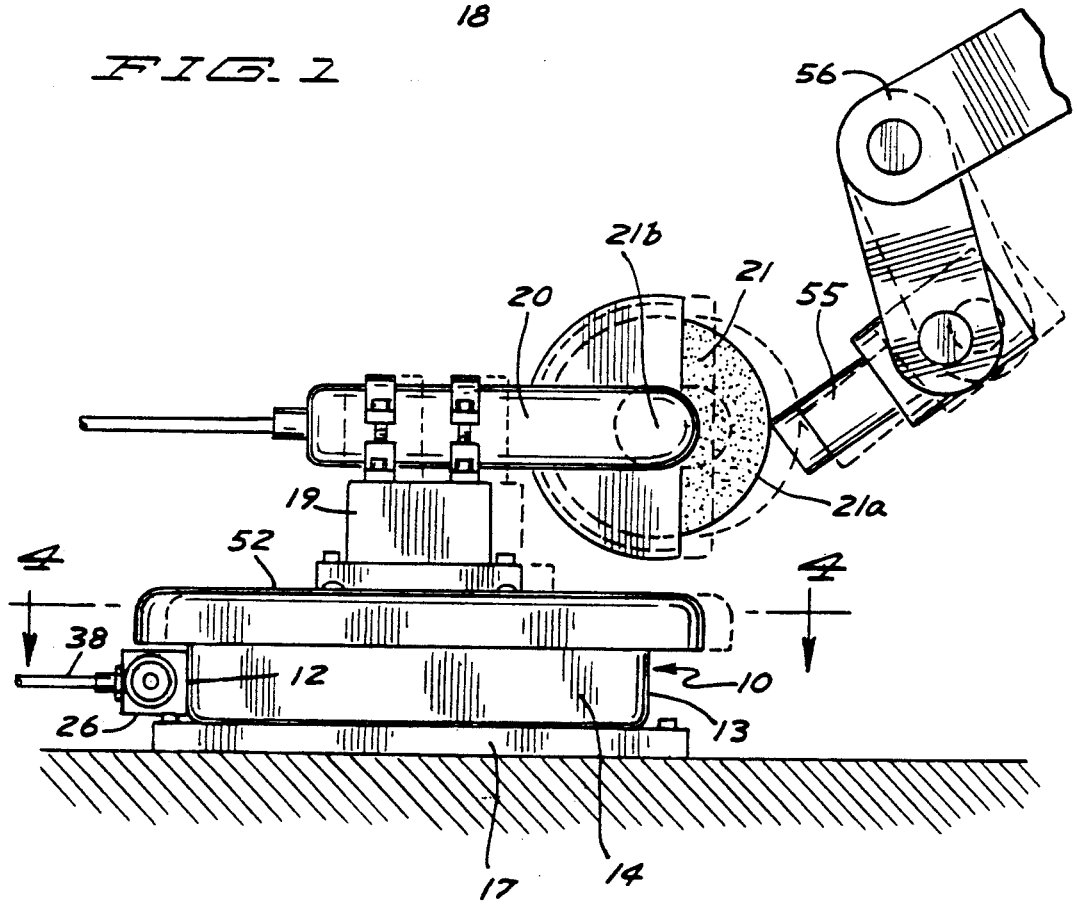
FIG. 2 is a view similar to that of FIG. 1 in side elevation.

Referring to the drawings and more particularly to FIG. 2, the housing 10 as shown has a bottom wall 11, front and rear walls 12 and 13 and end walls 14 and 15. Said bottom wall is releasably secured to said base plate 17.

Regarded now with the tool mounting plate removed as shown in FIG. 4, disposed within said housing and extending crosswise thereof equally spaced from the end walls thereof and being out of engagement with the side walls thereof are upstanding support members or internal walls 23 and 24 respectively having L-shaped bottom edge portions 23a and 24a secured through said bottom wall to said base plate as indicated;

Installed centrally between said support members is a low breakaway friction pneumatic cylinder 25.

Figure 3:
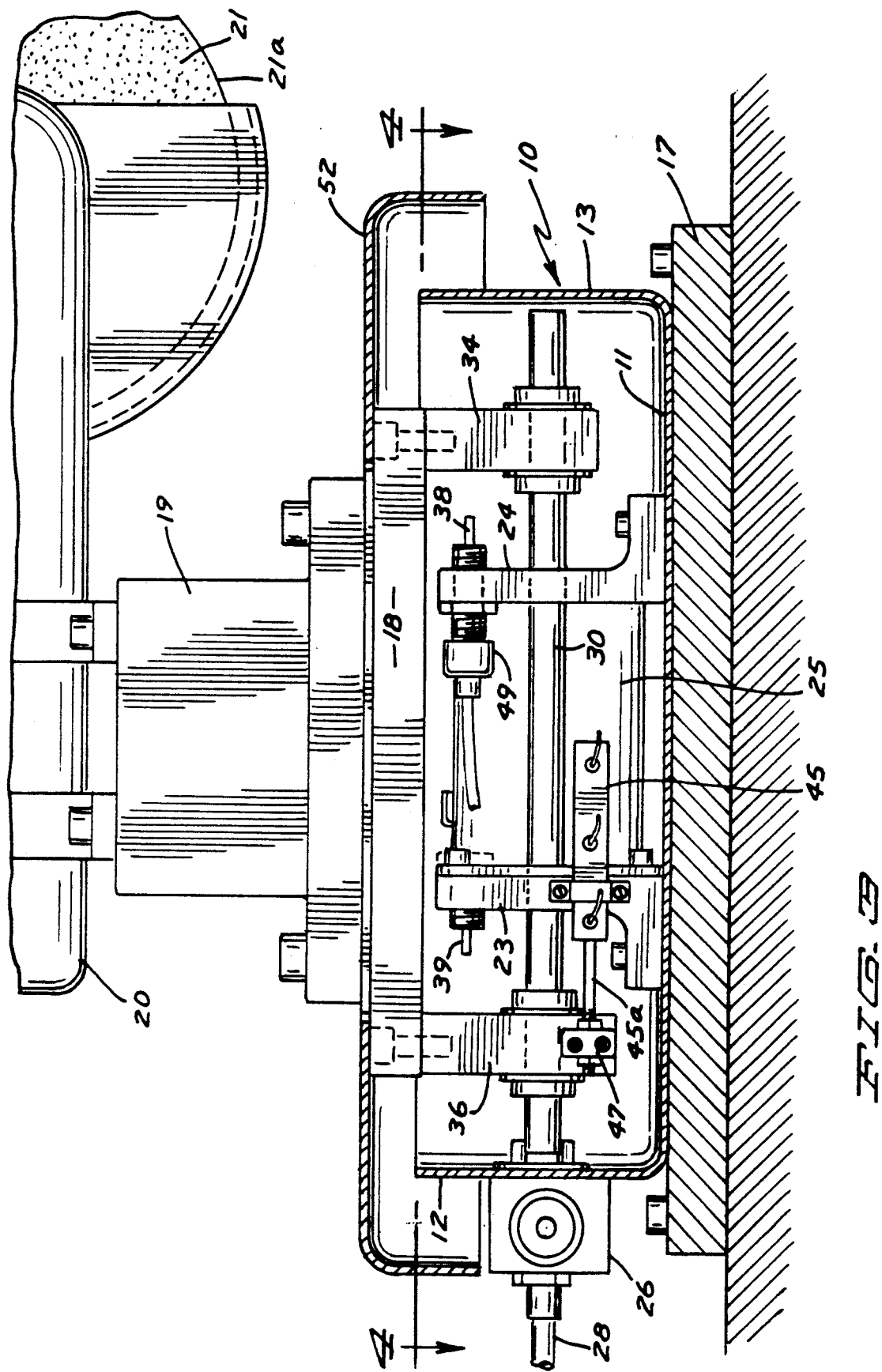
FIG. 3 is a longitudinal view in vertical section on an enlarged scale taken on line 3—3 of FIG. 1.

A pressure regulator 26 (FIG. 3) is mounted onto the outer side of said rear wall 12 having a tube connection 26a said cylinder and by means of tubing 28 said pressure regulator is connected with a source of pressurized air not here shown. Said pressure regulator is manually adjustable and is a conventional item.

Extending through said support members 23 and 24 adjacent each end thereof and approximately midheight thereof as here shown and substantially for the full length of said housing are slide rods 30 and 32.

Mounted onto said rods with the use of low friction bearings 34a and 36a are rectangular slide members 34 and 36 positioned respectively between said support members and said end walls of said housing. Said slide members are freely movable on said rods and extend upwardly slightly above the plane of the top of said support members.

With reference to said pneumatic cylinder 25, the same is provided with a piston or piston rod 25a which is connected with said slide member 34.

Adjustable sensor pins 38 and 39 are respectively mounted onto said support members 24 and 23 positioned for engagement by said slide members 34 and 36.

Overlying said housing and being secured to and resting upon said slide members 34 and 36 and secured thereto by appropriate screws is said tool mounting plate 18. Said piston 25a being connected to said slide member 34 provides the controlled force for the movement of said mounting plate and the application of the work wheel of said tool against the work piece being treated at the point of contact to which the work piece is brought.

The controlled pneumatic pressure applied to said cylinder 25 through the pressure regulator 26 controls the pressure to the movement of said piston 25a, said force being transmitted to the slide member 34 and through it to the mounting plate, and the work wheel of the tool mounted onto said plate. Thus there is a controlled force causing the movement of said slide member.

The manually set pressure regulator here indicated is one type which may be used. Other controls are within the scope of the concept herein such as an automatic control system, the same being conventionally available.

The other element of control is the speed of rotation of the work wheel. As the wheel edge surface wears away from use, its diameter decreases and as a result its preset peripheral or surface speed of rotation decreases.

The work wheel speed regulation is controlled, as here shown, by a conventional linear potentiometer 45 which is attached to the support member 23 by a bracket 44 and which has an extendible sensor or sliding member 45a which is secured to said bracket 47 which is attached to the slide member 36.

The sliding member 45a has attached thereto the bracket 47 and supports said tool mounting plate thereby moving the sliding member as the position of said mounting plate changes providing a signal to the potentiometer as the work wheel diameter decreases and thus sensing this the potentiometer by a voltage signal causes the adjustment of the speed of power tool 20 and thus of said work wheel.

Said sensor pins 38 and 39 upon being engaged by said slide members indicate the end and the beginning of the mounting plate stroke and this is indicated to proximity or optical sensors 49 attached to the support members 24 and 23 by an appropriate bracket to indicate contact of the work piece with the work wheel at the beginning of the tool mounting plate movement or stroke or to indicate that the work wheel has worn off its leeway allowance which is indicated by a signal. FIGS. 1 and 2 by dotted line indicate the extent of allowable movement.

In order to avoid the presence or accumulation of dust within said housing 10 resulting from the grinding of the work wheel, a low pressure air line 53 feeds a constant stream of air into and through said housing, said air line having communication with said inlet air line or tubing 28.

OPERATION

In operation, the device 10 is table mounted and the work pieces to be treated or finished are brought to a contact point for engagement by the work wheel.

At the contact point, said work wheel upon engaging or being engaged by the work piece brought to it, exerts a predetermined degree of pressure upon the work piece in doing its work and it rotates at a predetermined regulated rate of speed. The degree of pressure brought to bear against the work piece is also regulated.

The tool mounting plate 18 in carrying the power tool and its work wheel has a cycle of movement determined by said slide members, the member 24 being connected to the piston 25a of said cylinder 25.

The piston of said cylinder is operated by a pressure regulated flow of air into said cylinder and this stream of pressurized air actuating said piston causes the same to draw said sliding member 26 forwardly moving said mounting plate forwardly to place the work wheel at the predetermined contact point and holding the work wheel at said point under a predetermined degree of pressure.

As indicated, the work piece by a robotic or automated handling device is brought to the predetermined contact point for engagement by said work wheel.

However, there is leeway included in predetermining the travel distance or stroke lengths of said slide members 34 and 36 and of the tool mounting plate and tool carried thereon. As has been indicated, the work wheel wears with use and a commonly used sized work wheel may wear as much as three quarters of an inch without sufficient alteration in the pressure of the work wheel applied to a work piece to provide any noticeable difference in the finish results of the work piece.

With a wear greater than that allowed for, the slide member 36 will engage the sensor pin 39 sufficiently to cause the sensor pin to actuate an appropriate signal, not here shown, to alert the operator to reindex the travel path or replace the work wheel.

The wearing away of the surface of said work wheel and the consequent reduction of its diameter will change its peripheral or edge surface travel speed. This change in speed is sensed by the potentiometer 45 which in the present embodiment is in the form of a linear potentiometer. As indicated, there is mounted on the tool mounting plate the bracket 47 which provides a signal to said potentiometer through its sensor 45a as to the length of travel distance of the slide member and as this distance increases with the wear of the work wheel, said potentiometer having notice of this makes appropriate adjustment in the speed of rotation of said work wheel through the power tool which carries said work wheel by providing a proportional voltage signal to the power tool. Thus with a reduction in diameter through wear, the operating speed of said work wheel is caused to remain constant to provide uniform results.

Also as indicated, an open air line blows a constant stream of air through the housing to keep it free of dust and other contaminants.

It will of course be understood that various changes may be made in the form, details, arrangement of the device of the invention without departing from the scope of the invention which, generally stated consists in an apparatus capable of carrying out the objects above set forth, such as disclosed and defined in the appended claims.

What is claimed is:

1. A regulated surface treatment device, having in combination
    a housing having opposing walls,
    supporting means within said housing spaced from a pair of said opposing walls,
    a pair of slide members supported by said supporting means,
    a pneumatic cylinder within said housing,
    an air line to said pneumatic cylinder from a pressurized source of air,
    means regulating the pressure of air in said air line, a piston extending from said cylinder connected to one of said slide members,
    said piston being actuated by said pressurized air in said air line,
    a tool mounting plate overlying said housing and carried by said slide members,
    a power tool having a work wheel mounted onto said tool mounting plate,
    said piston actuated by said air stream causing said power tool and its work wheel to extend outwardly of said device a predetermined distance to a work piece contact point, and
    said piston exerting a predetermined pressure against said work wheel in its extended position.

2. The structure of claim 1, including
    a pair of transversely said supporting means extending between said pair of opposing walls, and said slide members respectively being slidably mounted onto said slide rods between said supporting means and said opposed walls.

3. The structure of claim 1, including sensing means carried in said housing respectively adapted for engagement by said slide members, said sensing means sensing a change in the extent of movement of said slide members by a change of pressure engagement therewith, and said change of pressure engagement causing said signal means to signal for a change of work wheel.

4. The structure of claim 1, including work wheel speed control sensing means, of a slide member, said increase being caused by a wearing away of the edge surface of said work wheel resulting in a reduction of its peripheral rate of rotation, said work wheel having its axis of rotation at right angles to the direction of movement of said slide members, and said means having connection with said power tool to increase the rotation of said work wheel to maintain a constant peripheral rate of rotation.

5. A regulated surface treatment device, having in combination a housing having opposing walls, supporting means within said housing spaced from a pair of said opposing walls, a pair of transversely spaced slide rods carried by said supporting means extending between said pair of opposing walls, a pair of slide members respectively mounted on said slide rods between said support members and the pair of opposing walls of said housing, a tool mounting plate carried by said slide members, a pneumatic cylinder disposed within said housing, a piston extending from said cylinder connected to one of said slide members, a pressurized air line to said cylinder actuating said piston, a power tool bearing a work wheel carried on said tool mounting plate, said piston causing said work wheel to extend to a predetermined contact point under a predetermined pressure for engagement by a work piece, and sensing means in said housing for engagement by said slide members signaling when said slide members are caused by said work wheel to move to a greater extent to extend to said contact point due to a wearing of the edge surface of said work wheel.

6. The structure of claim 5, including means regulating the peripheral edge surface speed of said work wheel, said work wheel causing said slide members to increase their predetermined extent of movement to said contact point as said work wheel wears causing a reduction in said surface speed, and said regulating means sensing the change in extent of movement of said slide members causes said power tool to accelerate the surface rate of speed of said work wheel to maintain a constant rate of surface speed.

7. A regulated surface treatment device, having in combination a housing having opposing walls, supporting means within said housing spaced from a pair of said opposing walls, said supporting means comprise a pair of spaced walls, a pair of transversely spaced slide rods extending through said pair of spaced walls and between said pair of opposing walls, a pair of slide members respectively mounted on said slide rods between said support members and said pair of opposing walls of said housing, said slide members being substantially rectangular in plan having a height above that of said supporting means, a tool mounting plate carried by said slide members, a pneumatic cylinder disposed within said housing, a piston extending from said cylinder connected to one of said slide members, a pressurized air line to said cylinder actuating said piston, a power tool bearing a work wheel carried on said tool mounting plate, said piston causing said work wheel to extend to a predetermined contact point under a predetermined pressure for engagement by a work piece, sensing means in said housing for engagement by said slide members signaling when said slide members are caused by said work wheel to move to a greater extent to extend to said contact point due to a wearing of the edge surface of said work wheel, and said sensing means being respectively mounted onto said supporting means for engagement respectively by said slide members.

8. A regulating surface treatment device, having in combination a housing having side and end walls, a pair of spaced support members in said housing transversely thereof and spaced respectively from the end walls thereof, a pneumatic cylinder, an air line from a pressurized source of air to said cylinder, adjustable means controlling the pressure of air in said air line, a pair of transversely spaced guide rods extending lengthwise of said housing through said support members, a pair of slide members respectively mounted onto said slide rods between said support members and the end walls of said housing, sensor pins mounted onto said support members for respective engagement by said slide members, a piston from said cylinder being connected to one of said slide members, a tool mounting plate supported on said slide members and secured thereto, a power tool mounted onto said plate carrying a work wheel, said piston causing said power tool and its work wheel to extend outwardly to a predetermined contact point for engagement with a work piece, and said work wheel being positioned to have its axis at right angles to the direction of movement of said slide members.

9. The structure of claim 8, including an air line from said source of air sweeping a stream of air across said device diverting dust laden air therefrom.

10. A regulated surface treatment device, having in combination
a housing having opposed walls,
a pair of spaced support members in said housing, transversely thereof respectively spaced from a pair of said opposed
a pair of transversely spaced guide rods supported by said support members longitudinally housing,
a pneumatic cylinder between said support members,
a pressurized air line running to said cylinder,
a pair of slide members respectively mounted onto said guide rods between said support members and said pair of opposed walls,
sensor pins mounted on said support members for respective engagement by said slide members,
a tool mounting plate carried by said slide members,
a power tool carried on said tool mounting plate having a work piece engaging work wheel,
a piston extending from said cylinder attached to one of said slide members, and
said presurized air line actuates said piston to move said slide members to cause said work wheel to extend outwardly of said device a predetermined extend to a contact point for engagement by a work piece.

11. The structure of claim 10, including
means in connection with said slide members sensing a change therefrom of the extent to which said work wheel moves to said contact point due to the wear of its work piece engaging surface, and
said means causing said work wheel to maintain a constant surface speed as its diameter reduces resulting from its work engaging surface wearing.

12. The structure of claim 10, including
means having engagement with a slide member to sense the extent of movement, said extent increasing as said work wheel wears,
said wearing of said work wheel reducing its edge surface speed, and
said wearing of said work wheel reducing its edge surface speed, and said means in sensing the change in extent of movement causes said power tool to accelerate the speed of said work wheel to maintain a constant edge surface speed.

13. The structure of claim 10, including
a linear potentiometer mounted in said housing having engagement with a slide member and adapted to sense a change in the extent of its movement as said work wheel peripheral rate of speed reduces, and
said potentiometer having such connection with said power tool as to cause said power tool to accelerate the speed of rotation of said work wheel to maintain a constant peripheral rate of speed.

14. The structure of claim 10, wherein
said sensor pins detect from engagement by said slide members an increase in their extent of movement beyond an initial predetermined extent indicating a wear of the periphery of said work wheel beyond a predetermined amount,
said sensor pins signalling to indicate the need for changing or reindexing the work wheel.

15. The structure of claim 10, wherein
said work wheel is preferably positioned to have its axis at right angles to the direction of movement of said slide members, tool mounting plate and said tool thereof.

16. The structure of claim 10, including
an air outlet, and
said outlet communicating with said first mentioned air line to provide a constant stream of air into and through said housing to keep the same free from the presence of dust and other contaminants.

17. The structure of claim 10, wherein
said slide members are rectangular in plan and extend to a height above that of said support members.

18. The structure of claim 10, including
means for regulating the pressure of air from said air line into said cylinder.

* * * * *